United States Patent
Verkasalo et al.

(10) Patent No.: US 10,742,753 B2
(45) Date of Patent: Aug. 11, 2020

(54) MEASUREMENT OF MULTI-SCREEN INTERNET USER PROFILES, TRANSACTIONAL BEHAVIORS AND STRUCTURE OF USER POPULATION THROUGH A HYBRID CENSUS AND USER BASED MEASUREMENT METHODOLOGY

(71) Applicant: Verto Analytics Oy, Espoo (FI)

(72) Inventors: Hannu Verkasalo, Engelberg (CH); Chris Modzelewski, Boonton, NJ (US); Eric Malmi, Espoo (FI)

(73) Assignee: Verto Analytics Oy, Espoo (FI)

( * ) Notice: Subject to any disclaimer, the term of this patent is extended or adjusted under 35 U.S.C. 154(b) by 0 days.

(21) Appl. No.: 14/190,358

(22) Filed: Feb. 26, 2014

(65) Prior Publication Data
US 2015/0244820 A1    Aug. 27, 2015

(51) Int. Cl.
*H04L 29/08* (2006.01)
*G06F 16/958* (2019.01)

(52) U.S. Cl.
CPC ............ *H04L 67/22* (2013.01); *G06F 16/958* (2019.01)

(58) Field of Classification Search
CPC ......... G06F 17/30867; G06F 17/30905; G06F 17/30324; G06F 17/30; G06F 17/30256;
(Continued)

(56) References Cited

U.S. PATENT DOCUMENTS

| | | | | |
|---|---|---|---|---|
| 2009/0265163 A1* | 10/2009 | Li | .................. | G06F 17/2785 704/10 |
| 2009/0326981 A1* | 12/2009 | Karkanias | ............. | G06Q 10/10 705/3 |

(Continued)

FOREIGN PATENT DOCUMENTS

| | | |
|---|---|---|
| WO | 2013/109916 A1 | 7/2013 |
| WO | 2013112312 A2 | 8/2013 |

OTHER PUBLICATIONS

Office Action for corresponding Chinese Application No. 201480078454.9 dated Mar. 27, 2020.

*Primary Examiner* — Mariela Reyes
*Assistant Examiner* — Courtney Harmon
(74) *Attorney, Agent, or Firm* — Arent Fox LLP; Michael Fainberg

(57) ABSTRACT

System for obtaining and analyzing data on online user behavior and other activity having regard to Internet connectable user devices, optionally mobile devices, the system being configured to collect data from a plurality of data sources, wherein the collected data includes at least individual user-level data acquired from user devices and census-level data indicating behavior and demographic characteristics across the entire population of users, active or measured services, with the user-level data being preferably collected using at least one user research panel of controlled constitution, preferably from multiple devices of each participant in the panel, the collected data being indicative of Internet, content, media, application, and/or device usage, organize the obtained user-level and census-level data into a multivalent categorized data set utilizing an ontological metadata schema, determine an electronic deliverable based on an integration of the user-level data and census-level data wherein census-level data is utilized to calibrate user-level data.

25 Claims, 7 Drawing Sheets

(58) Field of Classification Search
CPC . G06F 16/2228; G06F 16/29; G06Q 30/0251; H04L 67/22
See application file for complete search history.

(56) References Cited

U.S. PATENT DOCUMENTS

| | | | |
|---|---|---|---|
| 2010/0227302 A1* | 9/2010 | McGilvery | A61B 5/4866 434/236 |
| 2011/0239243 A1* | 9/2011 | Dierks | G06Q 30/02 725/14 |
| 2011/0313814 A1* | 12/2011 | Briggs | G06Q 30/02 705/7.31 |
| 2012/0109882 A1* | 5/2012 | Bouse | H04L 67/306 707/607 |
| 2012/0158959 A1 | 6/2012 | Sim et al. | |
| 2013/0073983 A1* | 3/2013 | Rasmussen | G06Q 30/02 715/753 |
| 2013/0198125 A1 | 8/2013 | Oliver et al. | |
| 2013/0332361 A1* | 12/2013 | Ciurea | G06Q 20/405 705/44 |
| 2014/0280234 A1* | 9/2014 | Chang | G06F 17/30864 707/749 |

\* cited by examiner

MEASUREMENT OF MULTI-SCREEN
INTERNET USER PROFILES,
TRANSACTIONAL BEHAVIORS AND
STRUCTURE OF USER POPULATION
THROUGH A HYBRID CENSUS AND USER
BASED MEASUREMENT METHODOLOGY

FIELD OF THE INVENTION

Generally the invention pertains to digital devices, communications including wired and mobile communications, and related applications and services. In particular, however not exclusively, the present invention concerns collection of multi-point Internet hardware and usage data, fusing this data together, and publishing frequently representative metrics around both the market level and user level behaviors with digital devices along with pertinent market structure information.

BACKGROUND

Various modern media measurement and analytics solutions are focused on collecting data based on only one source. Generically the sources are so-called panel studies where user behaviors are metered either through dedicated devices or downloadable software meters, or through embedded tags (on (web) sites or apps (applications)) or SDKs (apps) that collect data on a particular app. Alternatively, desired data may be acquired through traditional user survey studies or interviews which suffer from the problem of respondent subjectivity and inaccuracy.

In the aforementioned studies the evident goal is to get a grasp of the underlying trends, habits, problems and needs of users. However, each of the current methods has its own underlying problems. For example, with few exceptions, the costs of recruiting, maintaining, and validating a panel that is representative behaviorally and demographically, are prohibitive. SDKs (software development kit) and tags only provide data on participating properties but not all. Surveys and interviews are a better indication of brand strength than actual behavior and there is no existing approach that could provide information conceptually on all key areas of the Internet ecosystem in terms of 'hard', objective, observation-driven data: hardware installed base and sales, content and app distribution, and usage/transactions as completed by the user.

The evolution of media and Internet services such as web sites or web-accessible services is now faster than ever, and new devices emerge in the market place continuously. Also, one user typically has multiple, rather than one, Internet-capable devices. Holistic understanding of not only usage, but also devices and content distribution, would be needed to explain the market dynamics and to provide all-in-one research products to key customers participating in the Internet ecosystem.

As an example, penetration of certain type of devices affects the distribution of a certain service, either because it is pre-embedded in the device or the app stores (or other content distribution mechanisms) are driving the downloads of that service with that particular device. As another example, it is not enough to understand how many people download certain apps from app stores, but more increasingly it is important to understand the conversion from downloads to actual usage, and further to the money spent by the user in using the service. Further, the popularity of and variety of services available on a certain device can affect the sales of that device due to better perceived functionality, user experience, or through social circles. There are therefore significant feedback loops in this system.

Another prevalent trend is that people not only have multiple devices, but they also use multiple user interfaces, wearable technologies, or attached devices, all working totally or partially supported by a so-called master device. Tangible examples include smartwatches or digital goggles type of devices, which are further attached to a smartphone device. The measurement of activities through those attached devices and wearables, is certainly of future key importance, too.

There's thus a need for scalable media measurement solution capable of observational Internet measurements that are better adapted to the modern media environment where complexity and fragmentation of devices, applications, and services have become the norm. Such a media measurement solution would therefore provide a dynamic, high-resolution approach for holistic Internet metering and analytics, integrating metrics around hardware installed base, content distribution, and user behaviors into a single framework, and leveraging best-in-class methods to capture each facet of the online ecosystem. The result yields an integrated and responsive system capable of providing much more than the sum of its parts, and far more than previous isolated solutions.

SUMMARY

Therefore, according to one aspect of the present invention, an at least substantially electronic system for obtaining and analyzing data on online user behavior and other activity having regard to Internet connectable user devices, optionally mobile devices, is configured to
collect data from a plurality of data sources, wherein said collected data includes at least individual user-level data acquired from user devices and census-level data indicating behavior and demographic characteristics across the entire population of users, active devices, or measured services, with said user-level data being preferably collected using at least one user research panel of controlled constitution, further preferably from multiple devices of each participant in the user panel, said collected data being indicative of Internet, content, media, application, and/or device usage,
organize the obtained user-level data and census-level data into a preferably multivalent categorized data set utilizing an ontological metadata schema,
determine an electronic deliverable based on an integration of the user-level data and census-level data, wherein census-level data is utilized to calibrate user-level data,
the deliverable having a dynamically selectable, preferably user-selectable, scope in terms of a number of interest factors regarding used devices or online behaviors, preferably including application usage, application distribution, content usage, content distribution, application monetization, user demographics, device distribution, device characteristics, device usage, and/or time factors.

Optionally, the system may further incorporate collecting sample-derived statistical stratification data that estimates the distribution of characteristics across the user population, whereupon the system is configured to organize also the stratification data into the data set and utilize it in the determination of the deliverable, including the calibration of user-level data.

In one embodiment, the user-level data is further collected from a second, potentially larger, user panel. Preferably still, both the panels naturally comprise a plurality of users. Preferably, the panels have no overlap (no shared users). The control over the constitution of the second user panel may be reduced in comparison to the first panel. The second panel may be open to, if not practically all, at least a very large number of participants that may need to simply fulfill a number of basic requirements like legal adulthood.

In another, supplementary or alternative, embodiment, data collection utilizing the user devices includes embedding related measurement software into functionally separate other piece(s) of software, the other software preferably including software that is primarily designed for a different purpose than data measuring/logging and/or provides a different, distinct user benefit in terms of e.g. entertainment, communication, or messaging related function, data processing tool(s), etc. The measurement software component may be included as an additional module in a single electronic software deliverable to the user.

In a further, supplementary or alternative, embodiment the user-level data is collected through one or more master devices of a user, to which master devices there may be one or more other attached devices, such as external UI (user interface) devices (smart goggles, etc.) at least functionally connected, the usage of which is measured by utilizing the master devices as the connection point to the network data collection servers, and utilizing directly (e.g. observing the status and activity of the attached device through direct API calls of the attached device) or indirectly (e.g. by observing the traffic trace between the attached device and Internet network through a device that is serving as a so-called gateway device) the master devices in logging the activity of the attached devices.

Optionally, in the case of multi-device measurement, the master device to which at least one attached device is connected, is configured to perform at least one action selected from the group consisting of:
  a. Track traffic, signals, or other events that take place between the attached device(s) and master device;
  b. Poll passively or actively the application programming interfaces of the attached device(s) in order to collect measurement data;
  c. Store the collected measurement data in the master device temporarily or for a pre-determined duration of time; and
  d. Send the data to network based data collection servers for the purposes of analyses In a further, supplementary or alternative, embodiment the census-level data collected includes data, such as a number of data points, describing the distribution of characteristics amongst the entire targeted population or a complete and rigorously-defined subset thereof, obtained from a number of Internet network-centric data sources, potentially including but not limited to carrier data, ad network data, ad exchange data, site/app analytics platforms provided data, network gateway or proxy data, and/or demand-supply or other content delivery platforms-based data.

Applying the aggregations of Internet (network) based data processed and modelled generally in a manner congruent with the descriptions provided herein, estimations of the static current user base of target user (Internet) devices e.g. in a given market could be populated. Different characteristics such as the rate of growth or decline of such a population may be dynamically modeled. In other words, census-level data such as network(-centric) data could be utilized, potentially even as a stand-alone solution omitting the user data calibration aspect generally set forth and preferred herein, to estimate the structure and e.g. growth of the installed base of Internet devices.

Yet, in a further, either supplementary or alternative, embodiment the census-level data collected includes data, such as number of data points, describing the aggregate behaviors of the target population, which data may be obtained e.g. from a number of content distribution platforms, such as public app stores or digital market places available for access by the users through digital (user) devices and e.g. the Internet.

Optionally, in the case of utilizing census-level data where the data obtained thereof is incomplete, the incomplete data may be complemented or adjusted using a number of statistically valid modeling methods such as attribution, calibration, and fusion that conform to the best theoretical and methodological practices as applicable.

In a further, either supplementary or alternative, embodiment the user-level and census-level data sources are integrated through an overlay metadata platform, which models interrelationships between concepts, subjects, and entities observed in the varying data sources before and after calibration and processing.

In a further, either supplementary or alternative, embodiment, a number of user devices are configured to provide data regarding behavioral or contextual events external to the device, for example ambient sound or image recognition deliverables of automatically captured camera photos or audio recordings, to be sent along with other collected measurement data by the measurement software to the external data collection server(s) of the system for the purposes of analysis.

In another aspect, a method for obtaining and analyzing data on online user behavior and other activity having regard to Internet connectable user devices, optionally mobile devices, comprises
collecting data from a plurality of data sources, wherein said collected data includes at least individual user-level data acquired from user devices and census level data indicating behavioral and demographic characteristics across the entire population of users, active devices, or measured services, with said user-level data being preferably collected using at least one user panel of controlled constitution, further preferably from multiple devices of each participant in the user panel, said collected data being indicative of Internet, content, media, application, and/or device usage,
organizing the obtained user-level data and census-level data into a multivalent categorized data set utilizing an ontological metadata schema, and
determining an electronic deliverable based on an integration of the user-level data and census-level data, wherein census-level data is utilized to calibrate user-level data, wherein the deliverable has a dynamically selectable, preferably user-selectable, scope in terms of a number of interest factors regarding used devices or online behaviors, preferably including application usage, application distribution, content usage, content distribution, application monetization, user demographics, device distribution, device characteristics, device usage, and/or time factors.

In a further aspect, computer program product embodied on a non-transitory computer readable medium, comprises code for obtaining and analyzing data on online user behavior and other activity having regard to Internet connectable user devices, optionally mobile devices, incorporates
collecting data from a plurality of data sources, wherein said collected data includes at least individual user-level data acquired from user devices and census-level data indicating behavioral and demographic characteristics across the entire population of users, active devices, or measured services, with said user-level data being preferably collected using at least one user panel of controlled constitution, further preferably from multiple devices of each participant in the user panel, said collected data being indicative of Internet, content, media, application, and/or device usage, organizing the obtained user-level data and census-level data into a preferably multivalent categorized data set utilizing an ontological metadata schema, and determining an electronic deliverable based on an integration of the user-level data and census-level data, wherein census-level data is utilized to calibrate user-level data, wherein the deliverable has a dynamically selectable, preferably user-selectable, scope in terms of a number of interest factors regarding used devices or online behaviors, preferably including application usage, application distribution, content usage, content distribution, application monetization, user demographics, device distribution, device characteristics, device usage, and/or time factors.

The utility of the present invention resides in a variety of issues depending on the particular embodiment in question. The invention provides a feasible solution for combining certain types of user-centric and network-centric data together, whereupon, through an integrated methodology, desired electronic reports and other information deliverables can be conveniently obtained, in which the representativeness and scope of available information is superior to that which is achievable using different data sources separately, and the availability of metrics across hardware and user behaviors is wider than previously seen. The utility of the invention also lies in the ways in which industry players can interrogate such data to inform their tactical and strategic decisions, including decisions around product marketing, marketing campaign design, product features or pricing, or investment decisions as related to individual players in the digital ecosystem.

Further, different embodiments of the present invention enable constructing deliverables to identify market trends, obtain competitive insights, and to learn about new emerging opportunities in the digital market place. The described invention provides a multi-screen framework to timely understand the various characteristics of the digital market place, effectively determining a system that is able to obtain census level data in today's multi-screen world, including mobile devices, and connecting this to novel methods of collecting transactional, behavioral and contextual data from such devices, processing the resulting data through an integrated metadata framework, and providing aggregate market metrics through a unified audience measurement projection calculus.

Yet, various embodiments of the present invention yield solutions economically and technically more scalable than prior art, and are believed to provide more accurate estimations of a wider array of metrics about a wider cross-section of the digital marketplace. Due to its design and reliance on multivalent data sources using diverse user-level data, diverse census-level data, and diverse sample-derived stratification data, the embodiments are usually better able to adapt to changes in the digital marketplace, particularly those observable in prevailing market trends around digital content development, distribution, and usage and device manufacturing, distribution, and usage.

The expression "a number of" refers herein to any positive integer starting from one (1), e.g. to one, two, or three.

The expression "a plurality of" refers herein to any positive integer starting from two (2), e.g. to two, three, or four.

The expression "data transfer" may refer to transmitting data, receiving data, or both, depending on the role(s) of a particular entity under analysis relative a data transfer action, i.e. a role of a sender, a role of a recipient, or both.

The terms "a" and "an" do not denote a limitation of quantity, but denote the presence of at least one of the referenced item.

The terms "first" and "second" do not denote any order, quantity, or importance, but rather are used to distinguish one element from another.

The term "census" refers herein to a system or dataset reflecting the behavior, characteristics, or performance of preferably all members of a given and precisely defined group of measured subjects (e.g. users, services, devices, etc.). This data is explicitly based on all subjects/members of the defined and measured population, though that the defined and measured population may itself naturally be a subset of a larger population.

The term "calibration" refers herein to a process of statistical modeling by which data is weighted to adjust e.g. sample non-response and other biases to better reflect the measured population of users, services, or devices. This process of statistical modeling may involve a variety of statistical techniques well established in the literature, including but not limited to sample balancing, characteristic attribution, characteristic projection, and data integration.

The term "installed base" of devices refers to the information and metrics communicating and reflecting the number, structure, and/or cross-ownership of Internet devices (master and attached devices both preferably included) distributed or in use e.g. in a given market place, among a certain target population.

The term "data set" refers herein to a collection of data elements associated with each other by means of an ontological schema, for instance. The data elements may be physically located as distributed among a number of devices and/or data structures, such as databases or data tables.

Different embodiments of the present invention are disclosed in the dependent claims. Various other embodiments and further benefits of the invention become evident to a skilled person on the basis of the following detailed description.

BRIEF DESCRIPTION OF THE ATTACHED DRAWINGS

Various aspects and embodiments of the present invention are explained in more detail with reference to the appended drawings in which FIG. 1 illustrates an embodiment of the system in accordance with the present invention from a hardware standpoint.

Figure 4:
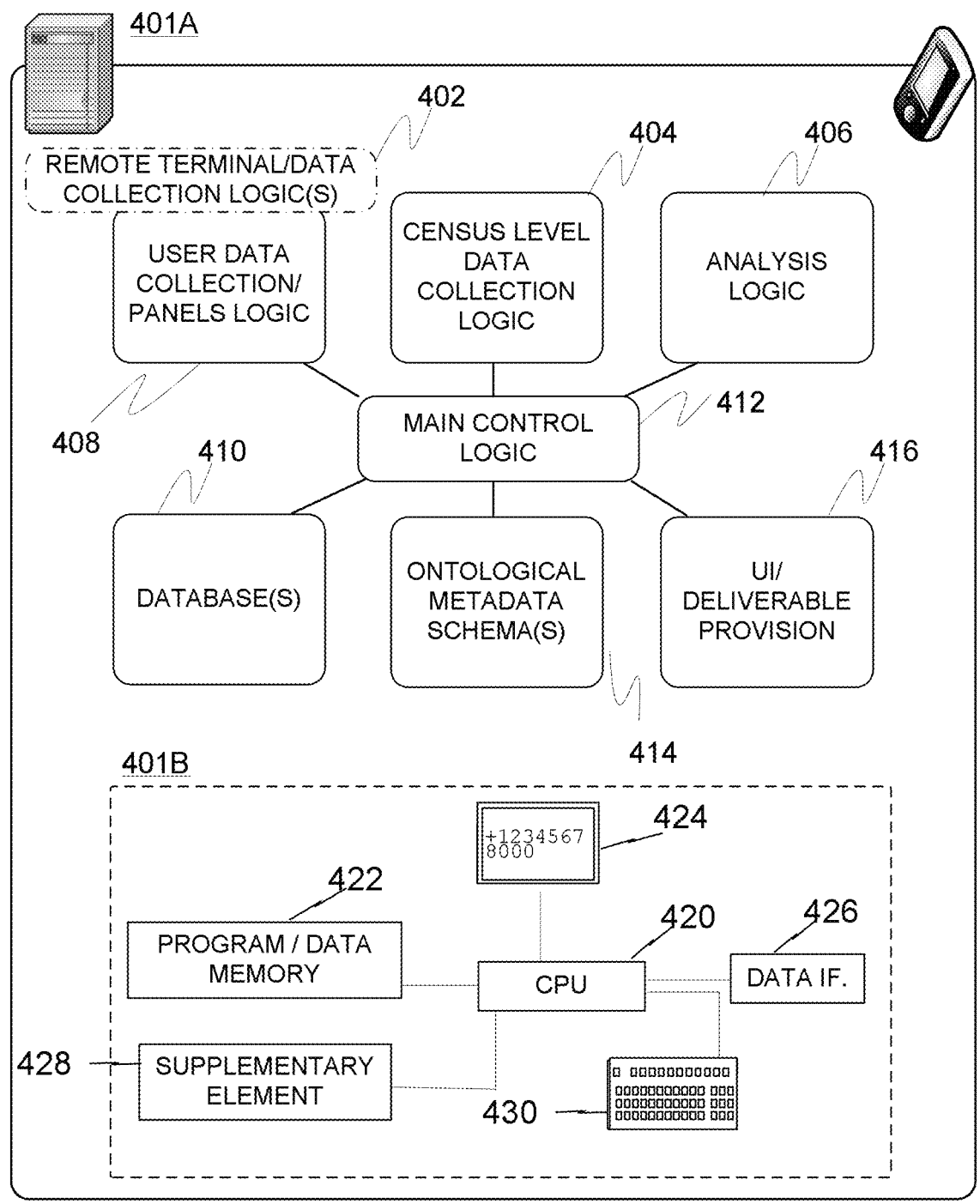

FIG. 4 provides a more detailed look at the internals of an embodiment of a system in accordance with the present invention with functional/logical and hardware views.

Figure 5:
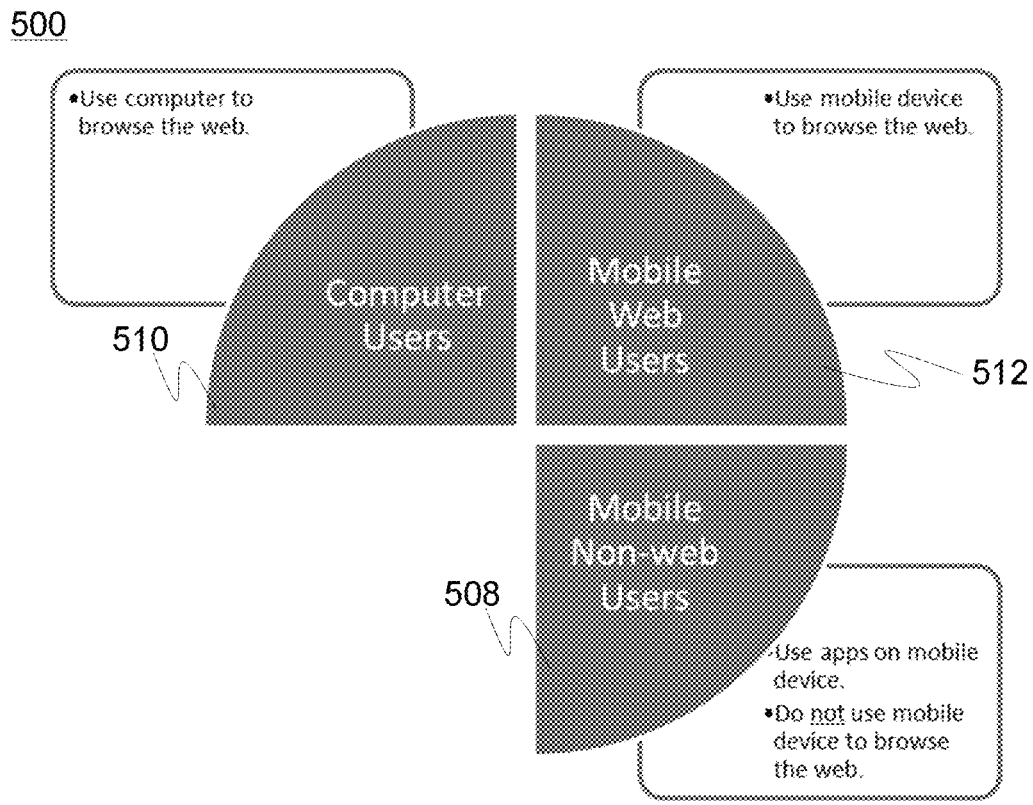

FIG. 5 illustrates different, potentially and likely, overlapping populations that can be measured by different embodiments of the present invention.

Figure 6:
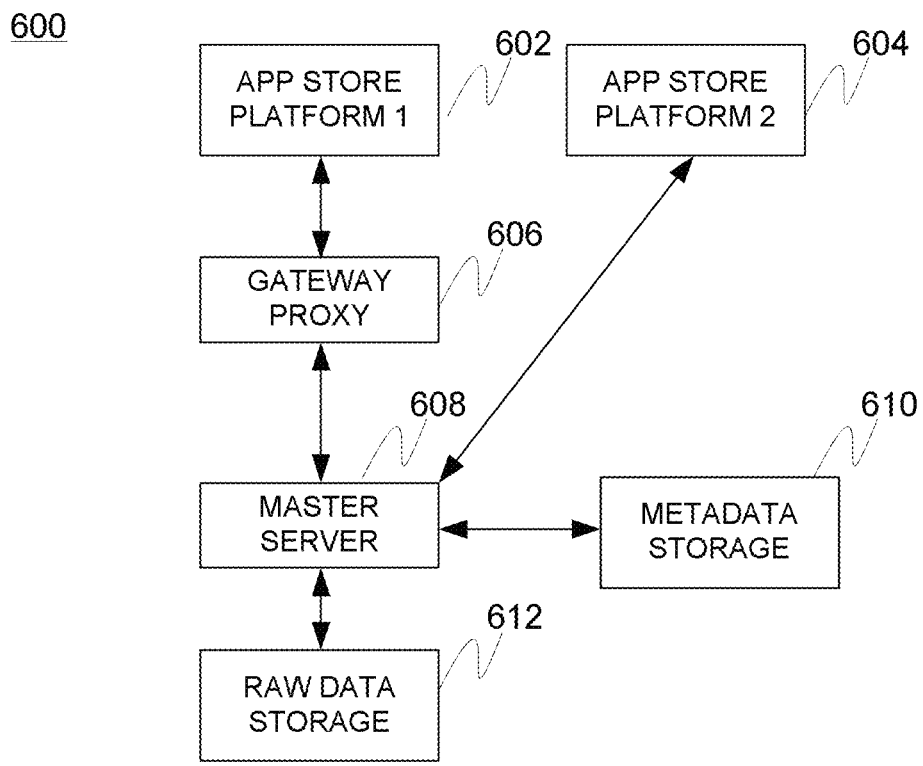

FIG. 6 illustrates an embodiment of a web site, or particularly app store, crawling technique that can be utilized in connection with the present invention.

Figure 7:
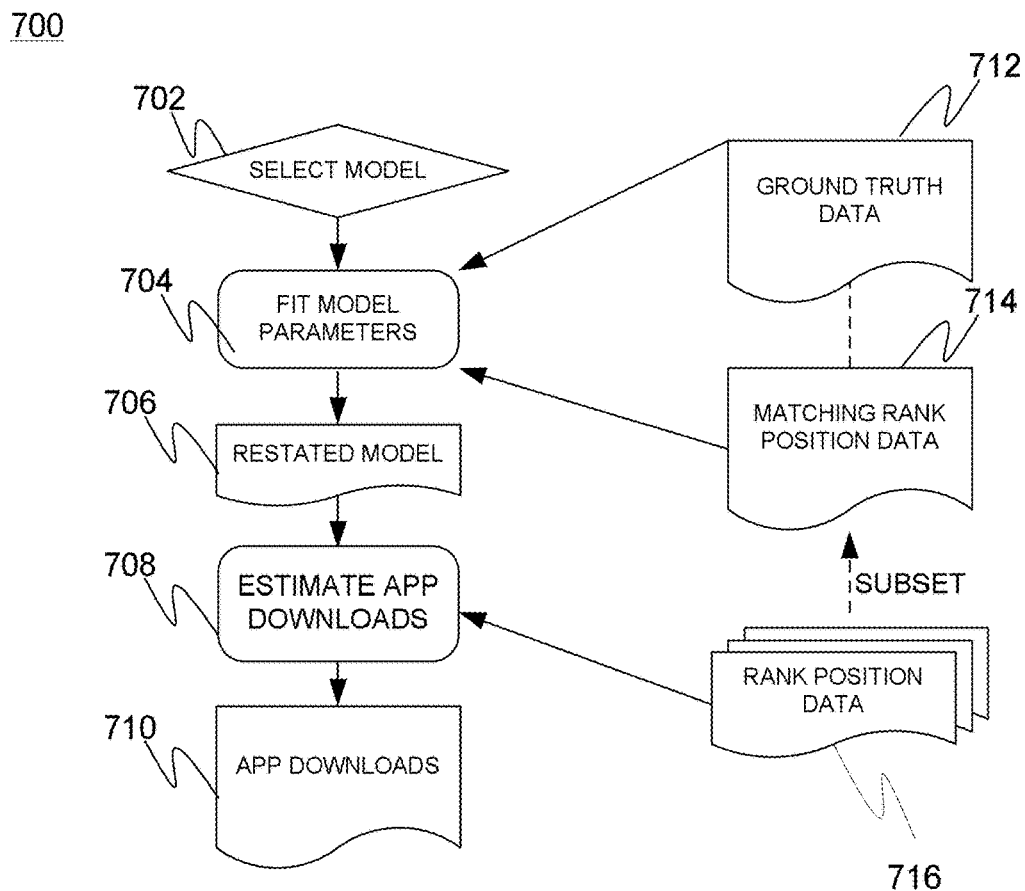
Figure 8:
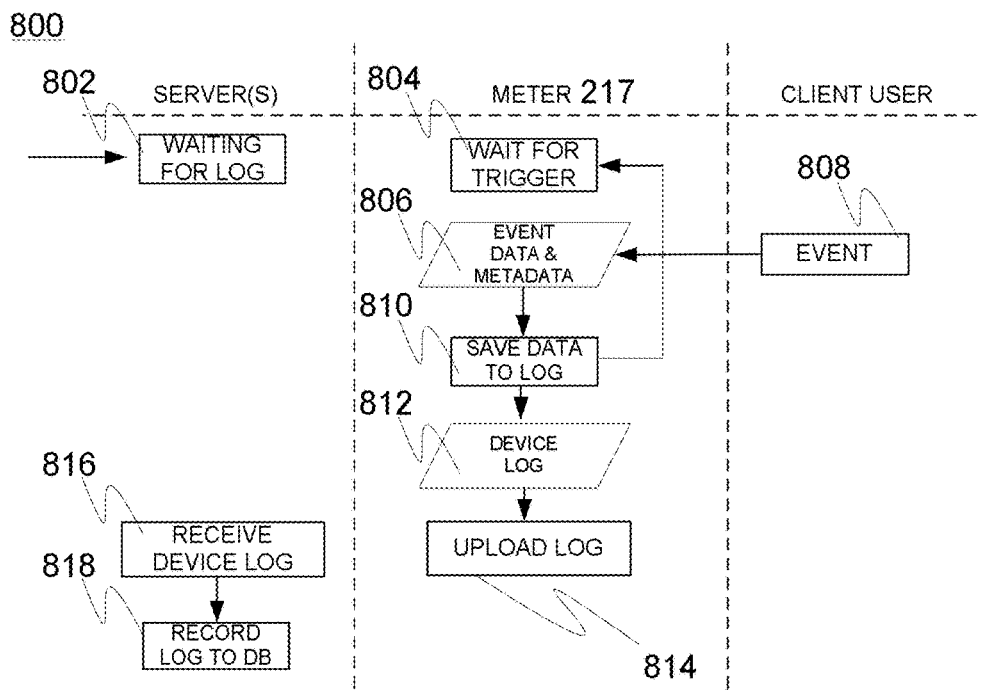

FIG. 7 depicts different aspects of an embodiment regarding the estimation of download statistics, e.g. number of downloads of an app, based on the available information in the form of e.g. app rankings FIG. 8 illustrates an embodiment of user device metering and related log file management.

Figure 9:
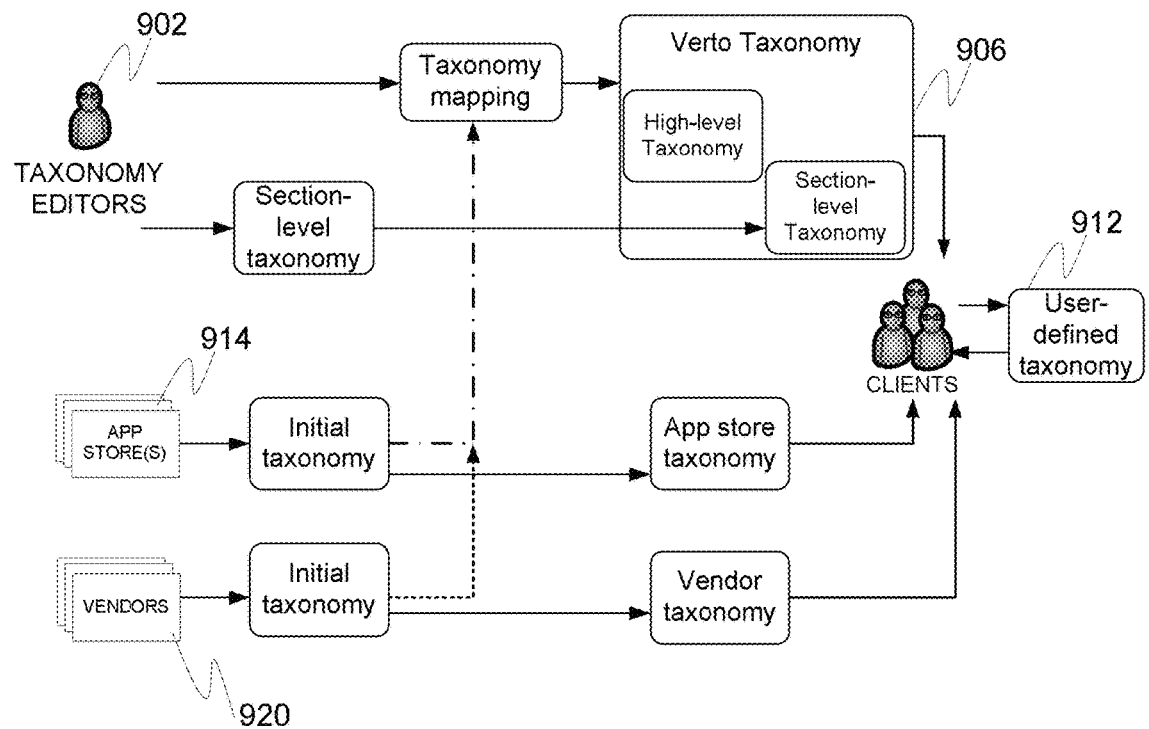

FIG. 9 illustrates one feasible application of context classification/categorization and related associations for use in connection with the present invention.

Figure 10:
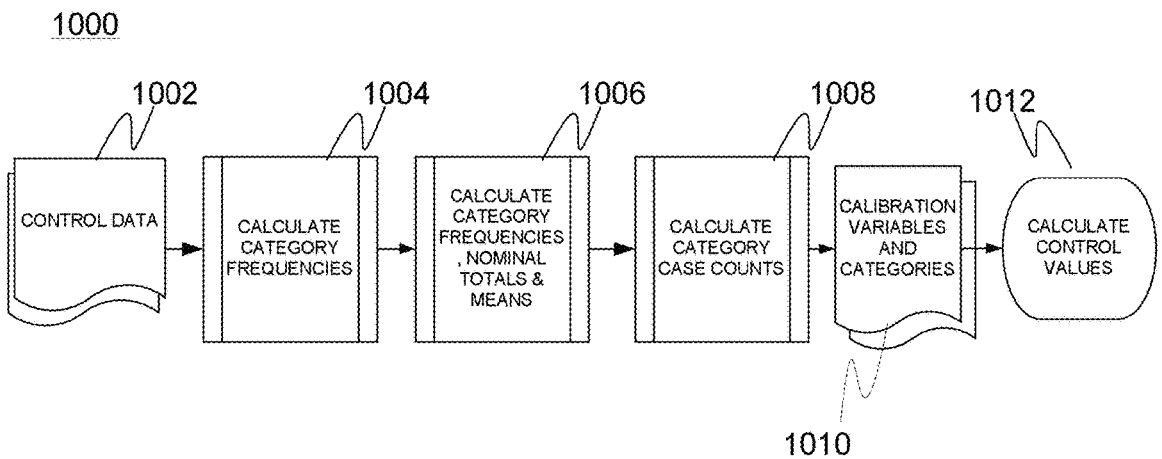

FIG. 10 illustrates an embodiment of sample review procedure for calibration variable and category selection (collapse) purposes to enable control value determination and calibration of user-level data.

Figure 11:
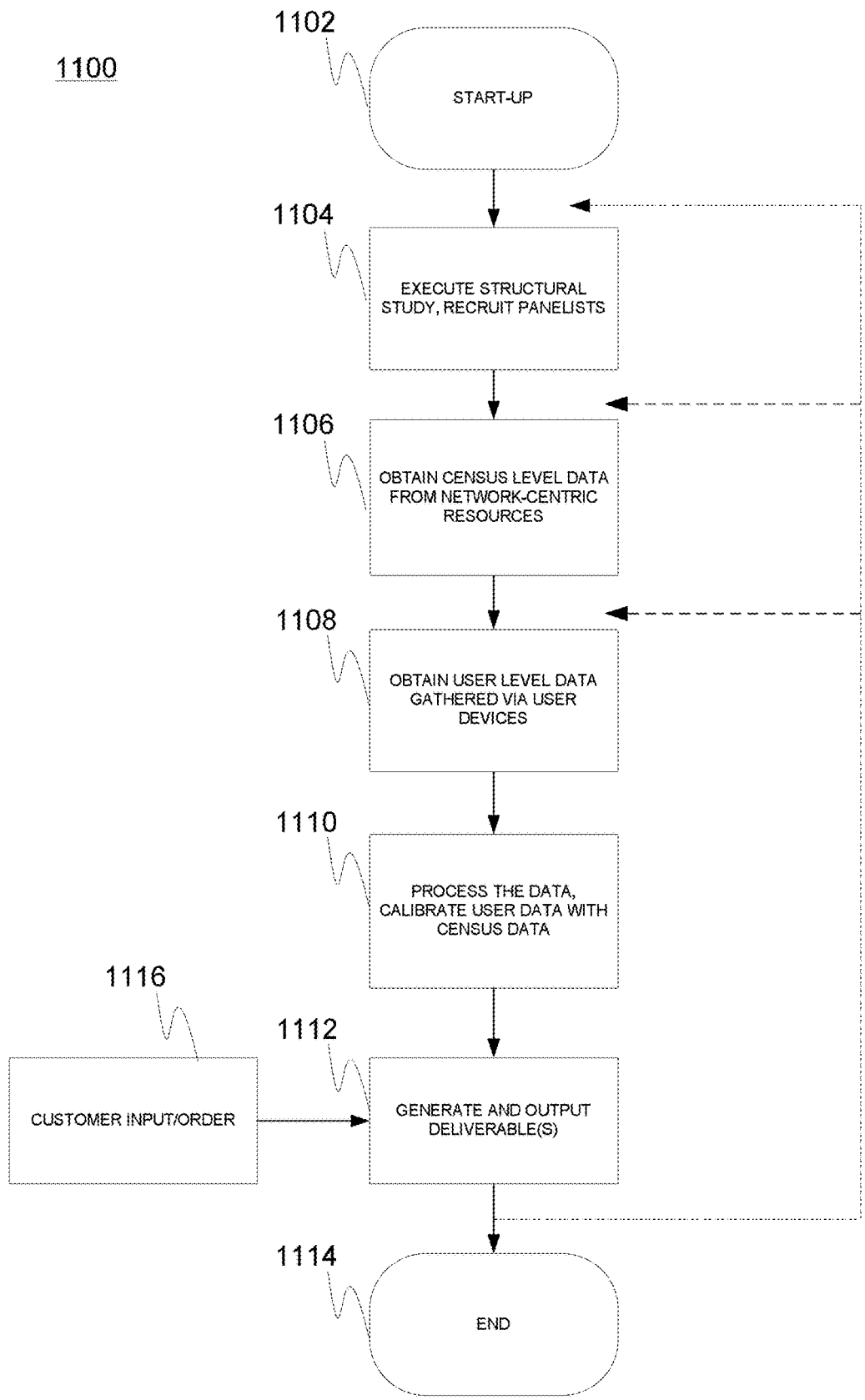

FIG. 11 is a high-level flow diagram of a method in accordance with the present invention.

DETAILED DESCRIPTION

In modern society device fragmentation is one of the factors changing the way in which individuals socialize, communicate, consume media, and perform personal and professional tasks. Consumers' interaction with digital media and resources has recently become mobile: they use smartphones, tablets, laptops, desktops, etc. to execute such tasks, and many even utilize multiple devices for these purposes on a daily basis.

The framework described here may be embodied as a system that is utilized or is at least capable of being utilized to measure a myriad of characteristics about or around consumer behavior expressed across a variety of digital devices.

Characteristics that can be determined include, but are not limited to, the consumers', or generally users', usage of various devices, the installed base of such devices, user actions, i.e. what the users do with their devices, thus finding out e.g. the ways how users utilize applications (apps) and web sites via these devices, what are the apps, web sites, or media the users download and/or are interacting with, and how these apps, services and content, are distributed to the devices in the first place. Relationship between downloading apps and actually using them may be established. Economic interactions relating to or using digital devices may be analyzed. Differences and relationships in usage across multiple digital devices may be investigated.

The above characteristics may be inspected at varying levels of detail (i.e. across all applications, for various categories of applications, or for specific applications), for various audiences (i.e. user/consumer groups), and/or for different time periods (e.g. on a daily, weekly, monthly basis) as provided by embodiments of the system and method in accordance with the present invention.

By using longitudinal passive metering, the framework described herein is harnessed to measure digital behavior observationally, advantageously using large-scale ongoing samples (e.g. Verto Partner Panels™) to capture the long-tail of fragmented activity. The obtained data can be calibrated and quality controlled on the basis of a number of substantially independent data sources including e.g. sample-derived stratification data for calibration of demographic distribution, a carefully-stratified longitudinal panel with passive metering for behavioral profiling, and census-data for behavioral calibration and scaling.

One concept underlying the deliverables of the system described herein resides in a capability to bridge e.g. the following three distinct categories of information together:

1: hardware distribution data indicative of the penetration and distribution of different (mobile) platforms and devices, reflecting ongoing changes in the (mobile) hardware market;

2: app (application) distribution & monetization data indicative of the penetration and distribution of different (mobile) applications, data quantifying the revenue generated by sales of these apps and in-app purchases made by users; and 3: app/content usage & engagement—data which shows how consumers interact and engage with (mobile) content (e.g. apps, widgets, web sites).

In addition to, or instead of, mobile platform/device/app related analysis, corresponding analysis concerning substantially non-mobile or unportable devices could be carried out provided that sufficient source data is available.

Figure 1:
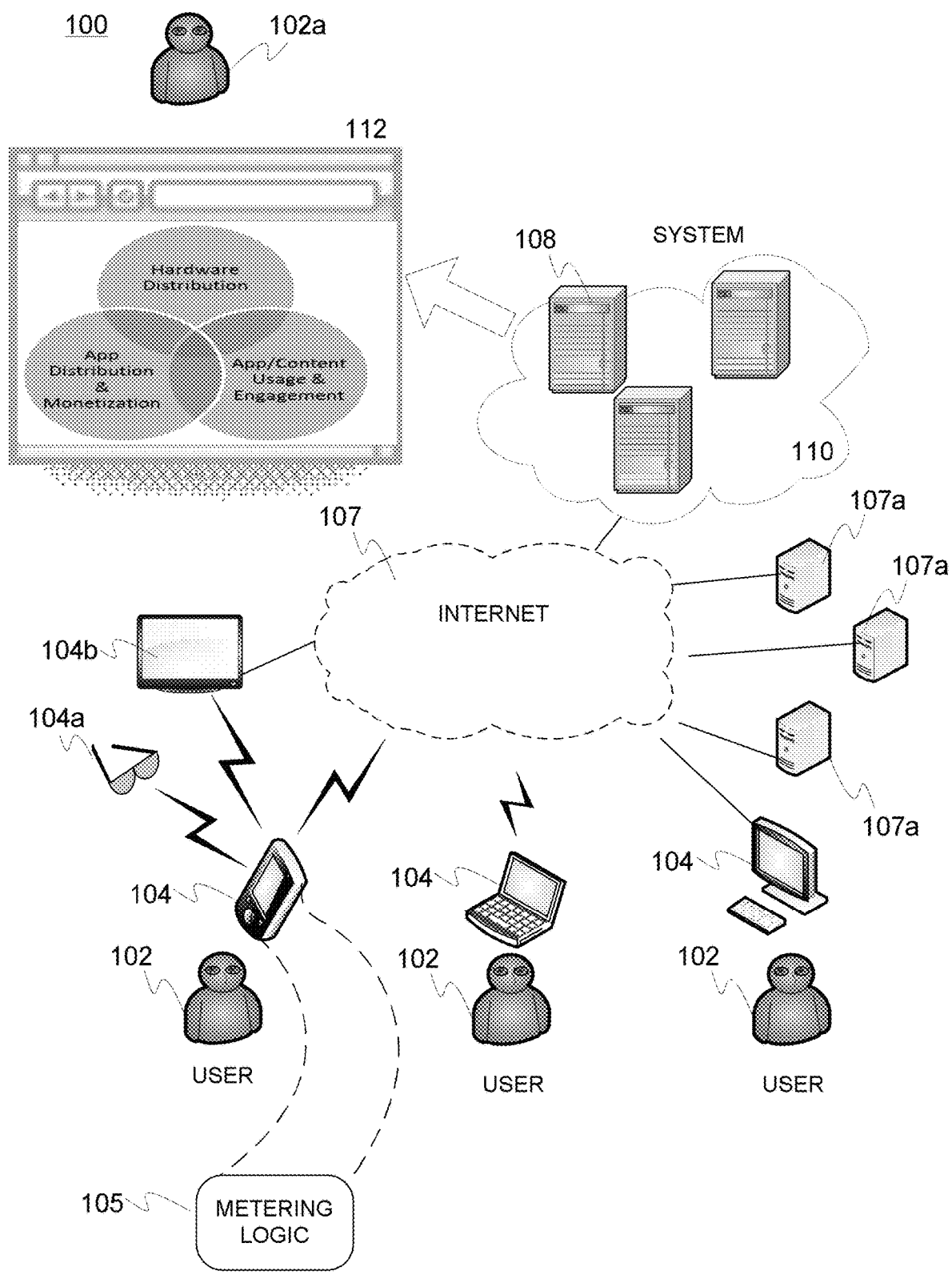

FIG. 1 illustrates an embodiment of a system in accordance with the present invention from both conceptual and device-centric standpoint at 100.

An electronic system 110 containing a number of at least functionally connected servers 108 is provided for activities like data acquisition and analysis regarding the users' 102 (typically persons) online behavior and other activities relative to network connectable, preferably Internet 107 connectable, user devices 104 such as desktop computers, laptop computers, tablets, cell phones and particularly smartphones, attached devices such as various auxiliary devices 104a, 104b (goggle type UI, smart TV, or other UI devices, for instance). Depending on the embodiment and viewpoint taken, the system 110 may be considered to include a number of user devices 104, optionally auxiliary devices 104a, 104b, and further elements, such as data sources, as well.

In addition to user-level data captured utilizing user devices 104, 104a, 104b, preferably via a metering/data collection application logic 105 (software), which may be called as research meter, provided therein, census-level data indicative of the distribution of characteristics amongst the entire targeted population or e.g. a complete and rigorously-defined subset thereof, is obtained from a number of user-independent data sources 107a, such as online services, which may include at least one network carrier, ad network, ad exchange, site or app analytics platform, network gateway, network proxy, and/or content delivery/distribution platform(s) like content management platforms or application stores. Data from these data sources 107a may be provided by the associated digital, network connected devices such as servers by a polling or fetching procedure initiated by the system 110 via applicable application programming interfaces (API), for example, and/or through a pushing mechanism by the data source(s)/server(s) 107a themselves according to predetermined logic, e.g. in response to the fulfillment of a triggering condition, which may incorporate a timer based condition (daily, weekly, or monthly data transmission among other options).

The system 110 is configured to collect, classify, and assemble entities observed in the obtained data into a multi-level categorized ontology by means of an ontological metadata schema and a number of different processing techniques to properly serve the target entities 102a, which may include one or more companies, persons, or basically whatever target parties or customers ordering and/or interested in the analysis results. Namely, these parties will be provided with desired type of deliverable(s) potentially including but being not limited to e-reports in the form of digital files or other representations, advantageously including visual representations, accessible and/or observable via suitable client equipment such as computing equipment and browser running thereon.

Indeed, the UI 112 for accessing the system 110 and/or inspecting the deliverables may include a web-based user interface preferably accessible via a common web browsing application optionally supplemented with tailored add-on module(s) to enhance the use experience. The web-based interface may be configured to allow the user to conveniently monitor the latest or historical data (analysis results), identify changes in the data (trends, etc.) and/or optionally to perform ad-hoc analyses using historical or current data if needed, through the interactive and reactive components of the web-based reporting interface. Additionally or alternatively, the deliverable(s) may be provided via a number of other output channels, e.g. via a number of APIs accessible by the target applications and/or services, or via e-mail.

As the parties' interests may vary, the system 110 is configured to preferably dynamically determine the scope of the analysis and/or of the deliverable(s) according to the client's needs provided thereto via the UI 112. The scope may be limited by the user population, used devices, used applications, application monetization, and/or time factor(s) in addition to other options. For example, the system 110 may be configured to provide a UI 112 that implements at least one user-changeable feature for adjusting the scope of data analysis and/or data representation selected from the group consisting of: filter in terms of e.g. one or more target groups/audiences, selection of one or more metrics to explore, selection of a scope (e.g. device category, device brand, app category, particular app, web site, etc.), and desired time period (e.g. "January 2014") and/or time resolution (e.g. daily, weekly, monthly, etc.).

Figure 2:
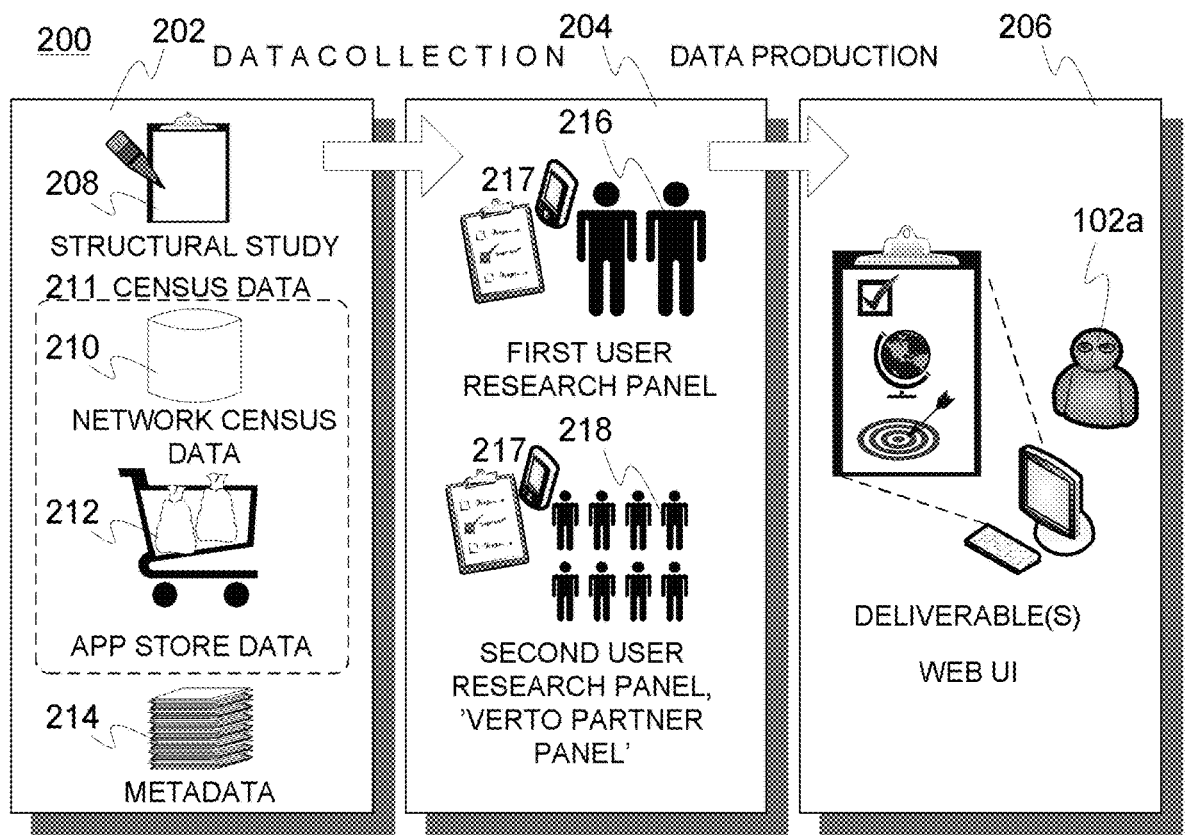
FIG. 2 illustrates the embodiment of the system with more conceptual and functional approach in contrast to FIG. 1.

FIG. 2 represents, at 200, an embodiment of the system from more conceptual and functional standpoint. General data (processing) flow is indicated by horizontal arrows in the figure between data collection activities and production/output activities.

At 202, a structural study 208 is indicated as one information source to be utilized as a basis for data calibration in the system, for example.

Preferably, the structural study 208 is or incorporates an independent survey to provide an independent basis, potentially together with census data 211, for a number of actions such as determining desired panel stratification (i.e. quotas) for the recruitment of the (first) research panel 216, and calibration of the resulting data collected during the data collection process 202 and collected or assembled during the data production process 204. The structural study 208 may be carried out as an offline study to maximize its coverage/representativeness, for instance.

The structural study 208 is designed to outline the basic statistical assumptions that describe the population researched. The structural study 208 may be used to answer (conceptually) e.g. the following questions:

What are the device ownership characteristics of the desired market's (e.g. certain country, state, region, or other geographical area) (adult) population?

What are the socio-demographic characteristics of the measured device owners?

The structural study 208 could be implemented by the party who will also implement the system described in this invention, or alternatively in certain implementations of the methodology, the study 208 can be licensed or commissioned from a reputable and credible market research vendor, or other social researcher applicable. There are a variety of research methods which can provide data sufficient to satisfy the requirements listed above, and which can readily be licensed or commissioned from third party research vendors.

The census data 211 may incorporate network census data 210, which may be obtained through network traffic or network activity monitoring, for instance, and specifically e.g. app store data 212. Preferably, census-level data describes a variety of subjects, which in some embodiments may include devices, users, services, applications, or web sites. Each dataset included in the census data shall thus provide either aggregate or case-level characteristics and information about the entire population to which that particular dataset applies. The census data 211 may be used with the structural data 208 to calibrate the data collected in the data collection process 202 and the data collected or assembled in the data production process 204.

The metadata 214 is, incorporates, or defines an ontological data set which is utilized to define entity taxonomies which serve to categorize entities (e.g. mobile devices, operating systems, visited web sites, applications, etc.) discovered or observed during the data collection process 202 and data production process 204. This data may be used to:

group related data items into categories as needed during the data production process 204, and/or obtain categorically-organized data in the deliverable(s) 206.

The research meter 217 may be embodied as software which is obtained, optionally downloaded to, and installed on digital devices (e.g. computers, smartphones, tablets, etc.) to monitor and log activity thereon. It may basically act as a primary source of data for the system and framework described in this invention, and its data will be used to collect observational data about the behavior/activity of devices monitored in the first research panel (see below) 216, and/or observational data about the behavior/activity of devices monitored in the second research panel 218, e.g. the aforementioned Verto Partner Panel™.

Now finally considering the panels 216, 218 in more detail, the first research panel 216 is preferably a passively metered panel of digital device users, which shall be recruited preferably using one selected and defined method. In some embodiments, this method may involve techniques such as CAWI (computer-assisted web interviewing) facilitated through pop-up intercepts, online access panel(s) invitations, opportunistic registration intercepts, CATI (computer-assisted telephone interviewing), CAPI (computer-assisted personal interviewing), or other commonly-utilized and well established research method(s).

Panel composition shall be advantageously determined based on targeted quotas derived from the structural study. Panelists will have the research meter 217 installed on their digital devices, and the research meter 217 will subsequently passively monitor their behavior. Passive metering generally refers to technology where the software tracking the activities of the user, or contextual parameters, at least to a significant extent runs on the background of said devices, without the need for users to interact with that software separately. In the installation of these software meters to digital devices, users may need to complete installation-related steps. One software meter running on such a device, may in some embodiments also yield measurement data on a number of other digital devices, for example the ones that are functionally attached to the master devices and thus communicating therewith optionally wirelessly.

One purpose of the first research panel 216 is to provide a high-quality (i.e. highly controlled, finely calibrated) source of data for consumer behavior. The size of the research sample will provide for a limited data depth (i.e.

limited availability of long-tail data), however the panel will specifically provide high-quality data for those subjects (e.g. apps, web sites, device manufacturers, demographic groups, etc.) whose audience/users is sufficiently large, if implemented carefully.

In detail and depending on the embodiment of the research meter 217 and upon completion of the data production process 204, the panel 216 may be designed to provide high-quality data answering e.g. the following questions:

What are digital device usage and penetration rates among the consumers of a certain market?

What resources (e.g. applications, web sites, media) do consumers interact with on their digital devices?

How do consumers interact with top resources (e.g. applications, web sites, media) via their digital devices?

For what, when, how, and in what amounts do consumers spend money on digital devices?

How do the above questions vary across devices when considering consumers with multiple digital devices?

What are the trends in app/content distribution, usage, replacement, and/or incremental usage?

The data from the panel 216 may form or be used to form one primary deliverable 206, and will shape the form of output data derived based on the second research panel 218 (e.g. Verto Partner Panel™).

As mentioned herein, the panel 216 may be recruited based on a set of stratified quotas and the panel stratification may be determined based on the results of the structural study 208.

Before being invited to participate in the first research panel 216 (i.e. before entering the sampling frame), a respondent shall meet a number of basic criteria, which may include different requirements regarding e.g. the respondent's age and residency, device/network ownership or accessibility, survey participation history, etc.

Panelists participating in the panel 216 may be compensated in a desired fashion. The mechanism of gratification and the processing of incentives for each particular panelist shall be determined in collaboration with the sample vendor who originated such a panelist. The incentive may be digital and allocated digitally, such as access or elevated access/user rights to digital content, services, apps, etc.

The second research panel, e.g. Verto Partner Panel™, 18, is preferably a passively-metered panel of digital device users most advantageously recruited via convenience sampling. In some cases the recruitment may be indirect considering e.g. scenarios in which the research meter 217 is included as embedded in certain end-user facing apps that users download primarily for purposes other than participating in the research study. The panel will consist of or contain users who have:

installed the research meter 217 bundled with one or more mobile applications;

provided the system with their demographic profile data; and/or agreed to provide anonymous data to the system.

Because the composition of the panel is, by default, substantially uncontrolled (i.e. "basically all are welcome") or almost uncontrolled, the role of the panel 218 is in developing an extremely large sample capable of providing a deep level of long-tail data. The panel 218 may be specifically configured to provide supplemental data for a large number of subjects (e.g. apps, web sites, devices, etc.).

And because the demographic and behavioral representativeness of the sample is uncontrolled in view of the foregoing, the data thereof will not be used to calibrate other data. Instead, the data from the panel 218 is itself calibrated during the data production process 204 with data that is more representative and controlled by nature, such as data from the first research panel 216, and other data collected in the data collection process 202.

Concerning the panel's 218 philosophy and related technical features in more detail, because the subjects that the framework described herein is aimed to report on are so fragmented, it is, in practical circumstances, impossible to provide complete/in-depth data on digital behavior without an extremely large sample size. Recruiting an extremely large sample using the rigorous procedures designed for the first research panel 216 (see above) would be prohibitively costly on a per-panelist basis. Therefore, the first panel 216 will be supplemented through the development of the second panel 218 preferably recruited on a convenience (uncontrolled, or 'catch-as-catch-can') basis.

The panel 218 is preferably not size-limited. However, in some embodiments, data from the panel 218 may only be included in the deliverable(s) 206 when the number of panelists selected through an applied quality control and validation process exceeds a predetermined number, e.g. 20 000 (twenty thousand).

In preferred embodiments, the composition of the second panel 218 will not be controlled a priori, but validation statuses are advantageously designed so as to sub-select relevant respondents for inclusion as validated (in-tab) panelists post factum.

The panelists of the second panel 218 may be recruited from a population of mobile device users (i.e. users of iOS, Blackberry, Android, and/or Windows Mobile devices, for example). For instance, the specific source of panelists may be those users that have installed one or more mobile applications that are integrated with the research meter 217, or e.g. research SDK (software development kit).

Every user who has installed an integrated app may, in principle, be invited to participate in the second panel 218. The invitation may be provided via the app itself, using e.g. a visual message. This participation is based upon the user's voluntary opt-in. However, for regulatory and ethical requirements it may be necessary that alongside the opt-in the user indicates their year of birth as a pre-qualifying characteristic (e.g. users below 18 years of age will automatically be opted-out).

Recruitment survey may be executed to collect basic/minimal data about the respondent so as to appropriately weight their data. Basic demographic information collected in the panel's 218 recruitment survey could include e.g. device type, mobile carrier, gender, education, geographic location, household size, etc.

This information to weight megapanelist's data may be technically derived from a number of sources optionally automatically utilizing e.g. the software-based observations, or integrating selected $3^{rd}$ party to describe the panelists, or using some form of pop-up or questionnaires to actualize this for the panelists.

The deliverable data 206 is the final output of the system described herein, but obviously the customer 102a receiving it may cultivate it further e.g. with proprietary tools, etc., if a need arises. Deliverable 206 contains calibrated, processed, and categorized information e.g. on device usage, app/service usage, and user behaviour, which will be made available in whole or in part to the customers optionally via a web-based user interface. Alternatively, e.g. a native app could be utilized to consume the information.

The deliverable(s) 206 may be embodied as a single, unified database on the backend, for example. However, each customer may be assigned specific user rights to access limited portion(s) thereof through the available UI(s) such as a web based interface.

For instance, the deliverable(s) may include at least one element selected from the group consisting of: hardware distribution, content distribution, app/content usage & engagement, and app analytics.

FIG. 11 shows a generic flow diagram 1100 of an embodiment of a method in accordance with the present invention involving the afore-explained themes and features.

At start-up 1102, the system is ramped up, which may refer to the acquisition and configuration of related hardware and software. The system may include a number of server devices, optionally disposed in a cloud computing environment, for example. Yet, 'silent' recruitment of panelists for at least the second user panel may have already been initiated already at this stage e.g. via convenience sampling, and related measurement, logging and reporting software be delivered to a multitude of user devices, such as mobile terminals or other terminals, preferably as bundled with other software. Still, e.g. the suppliers of census-level data may be selected and necessary data communication channels established.

At 1104, the structural study is executed to determine the stratification (quotas) of the first research panel, properties of the measured universe (demographics, etc.), which shall be used for calibration of panel data, etc. Recruitment of the panelists, especially for the first panel 216, may be then executed accordingly.

At 1106, census-level data is obtained preferably from a plurality of sources such as app stores, network data suppliers, etc.

At 1108, user-level data is received from the panelists.

At 1110, data processing takes place including organizing the data. Calibrating the user-level data e.g. with sample-derived stratification data (from the structural study 208) and/or census-level data takes place as described in further detail hereinafter.

At 1112, the deliverable(s) based on collected census- and user-level data are constructed. Item 1116 refers to customer input that shapes the content and/or form of the deliverables (such input may be received and taken into account by the system at various stages of the process, although being indicated in the figure not until item 1112).

At 1114, the method execution is ended.

As indicated in the figure by the various dotted loopback arrows, the execution of items may be and typically is repetitive and/or iterative as being clear to a person skilled in the art on the basis of this disclosure. Also the execution order may vary depending on e.g. the availability of new data and also parallel or alternate processing of items may and typically will take place in real-life implementations considering e.g. potentially iterative calibration for the user-level data.

Figure 3:
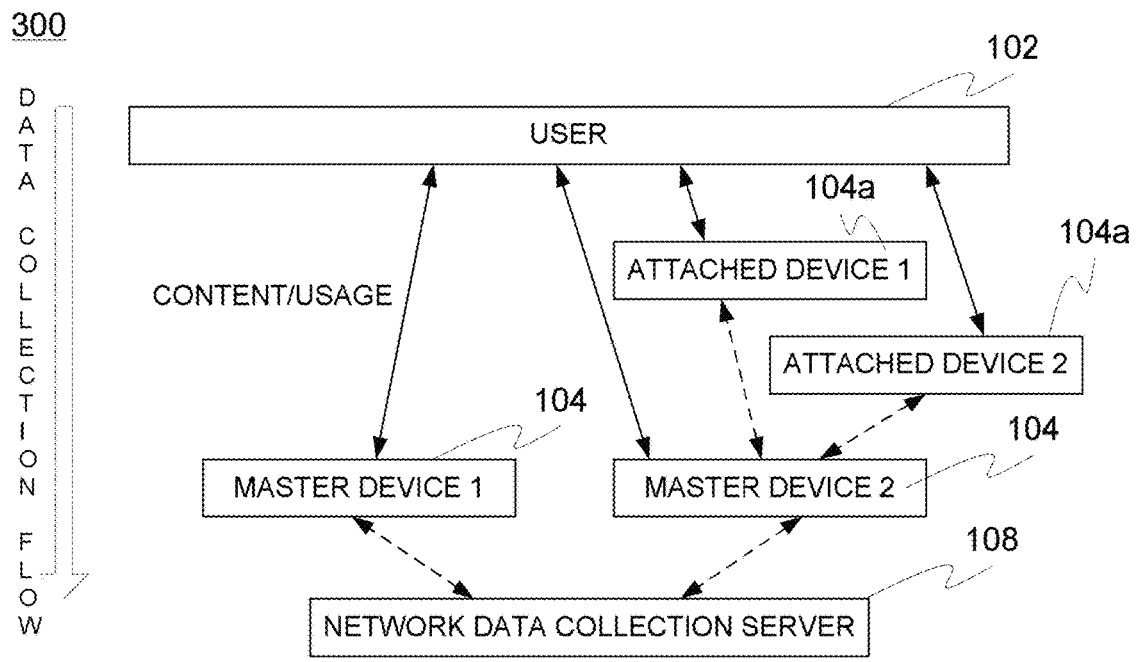
FIG. 3 illustrates an embodiment of multi-device usage incorporating a number of master devices and attached user devices.

With reference to FIG. 3, at 300 an embodiment of feasible multi-device approach to be utilized in connection with the present invention is depicted. Generally, communication between the user 102 and his/her devices 104, 104a is illustrated with solid lines and the communication between devices is indicated with broken lines. Indeed, in preferred embodiments of the present invention, multiple devices of a single user can be tracked, even though one or more of those devices cannot, or will not, be configured to execute at least full-scale software or hardware based data collection technologies for practical reasons. In particular, the system is preferably configured so that even though the users 102 interact with attachable or wearable devices or external user interfaces (examples being smartwatch devices or digital goggles type of digital screens), the related measurement data can be collected. In these cases the system utilizes so-called master devices 104 in between, to which such attached devices or user interfaces 104a connect, to perform one or more of the following functions:

1. Track traffic, signals, or other events that take place between the attached device(s) 104a and master device 104.
2. Poll passively (based on e.g. some contextual event triggers) or actively (based on predefined intervals, for example) the application programming interfaces (API) of the attached device(s) 104a in order to collect measurement data.
3. Store the collected measurement data in the master device temporarily or for a pre-determined duration of time.
4. Send the data to network based data collection server 108 of the system for the purposes of analyses.

Preferably, the master device is configured to track, store and send the data such that data originally concerning a particular device (either the master device itself or any attached device) can later be traced back to the same device. In a feasible implementation, while the user may have a certain user identification code or number (ID) assigned to him/her, each of the devices, does not matter if they are master 104 or attached (slave) devices 104a, have their own unique device identification number as well, even though some of them might be connected to each other.

This kind of implementation will make it possible break the obtained usage data down into different devices and user interfaces among other potential benefits during the analysis phase. Furthermore, in certain implementations, the engine handling the tracking/measurements, which may reside in a master device or in a remote server, in addition to assigning e.g. user ID numbers and/or device ID numbers (corresponding to the master devices), may be configured to assign or register user interface IDs to user interfaces/attached devices connected to the master device 104.

Indeed, in the implementation where measurements are to a significant extent executed and led by the master device 104 (for example that device being used as the data storage and a gateway towards the network, and to handle the identification/registration of the different user interfaces being used), but engagement and user actions may take place through an attached, tethered, slave device 104a, e.g. the following technical steps may be performed:

1. New or existing user interfaces are registered by the master device as being connected to the master device, either through dynamically listening to new connections, or alternatively, by polling periodically information about paired or connected devices, for example;
2. Status information, preferably including a heartbeat (device is being turned on, even if there is no active engagement with content, services, apps, taking place), is tracked for each device.

In the system described herein to track multi-device or multi-UI behaviors, the master device 104 shall advantageously log events and other measurement data, potentially including screenshots, centrally, without burdening the attached device 104a with these activities. The master device 104 may be configured to use either available widely used APIs and other function calls to collect this data, or alternatively/additionally in some implementations it could track more fundamental signaling traffic channels, HTTP data (as the main device being used as a kind of network gateway), or other stack or lower-level APIs.

With reference to FIG. 4, the internals of an embodiment of a system 400 in accordance with the present invention with functional/logical 401A and hardware standpoints 401B are shown therein.

Item 412 refers to main control logic that takes care of data acquisition from various sources, data transfer between different entities, configuration management, etc.

Item 410 refers to a number of data repositories such as databases for storing the data collected and processed.

Item 414 refers to ontological metadata schema(s) utilized for organizing and categorizing the data into a multivalent data set.

Item 416 refers to UI for outputting the deliverable(s) containing the integrated, categorized multi-level data obtained by processing and analyzing the collected user level data and census level data.

Item 408 refers to user level data collection logic(s) at the system or server end, whereas item 402 refers to a research meter 217 or (research SDK), i.e. logic taking care of data metering, logging, potentially processing, and forwarding on user devices and e.g. in connection with online/mobile services. Preferably the logic is prepared such that it can be easily plugged into any online or mobile service, or app, and as people use those particular services or apps, the logic is then activated in the background, running measurements, and being able to send measurement data to server(s) of the suggested system. All this may take place without necessarily providing any interfaces or configuration possibilities to the "host app" to affect how the logic works. In some implementations, however, there can be a number of selected "feedback loops" built into the logic module, so that it may provide signals, data, or something else, back to the host app.

A list of apps integrated with the logic 402 will be maintained preferably at all times for oversight/management purposes. Every (mobile) user who installs an integrated app may be given the opportunity to participate in (opt-in to) the second research panel 218. This population of users who have installed an integrated app may thus establish the sample frame for the second panel 218.

Item 404 correspondingly refers to census-level data collection logic. Although not explicitly indicated in the figure, also in this case research SDK or corresponding data collection entity installed at a remote entity, e.g. at the servers running and/or hosting an online service, may be applied for data collection purposes.

Item 406 refers to data analysis logic configured to verify, combine, calibrate, process and organize the collected data utilizing e.g. the schema(s) 414 to obtain the desired kind of deliverables for output via the UI 416.

Hardware-wise 401B, each of the applied devices such as server(s) and user device(s) (both master devices and attached devices) may include a number of processing devices 420 such as microprocessors, microcontrollers, signal processors, etc. for processing instructions and data. Further, they may contain memory (chips) 422 for storing program instructions and other data such as collected user-level and/or census-level data, processed data, ontological schema(s), deliverables, etc.

Data interface 426 may refer to a peer-to-peer interface or network interface that may be wired or wireless, for instance. A server type device may typically contain a (wired) network adapter with e.g. Ethernet or other LAN type connectivity means, whereas a mobile user device may typically contain a number of wireless transceivers, e.g. a cellular transceiver (e.g. 3G) and/or WLAN (Wireless Local Area Network) or Bluetooth transceiver, for accessing the Internet and/or communicating with near-by other devices. Also a tag reader (RFID (Radio frequency identification) or NFC (Near-field communication), for example) may be included. UI may comprise a display 424 and data input device 430 such as a keypad, keyboard, touch interface (touchscreen, for example), etc. Yet, the devices usually contain various other elements 428 such as one or more sensors, power supply components, casing, etc.

Program code (software) for carrying out method steps and generally procedures described herein by a number of computer devices, may be generally provided on a carrier medium such as memory card or optical disc, or transferred over a wired or wireless communications medium.

With reference to FIG. 5, relationships between different potential populations measured via the census data 211 are shown at 500. Namely, data that is included in the census data 211 may be sub-divided into independent and unrelated data sets each of which reports data about a particular subset of the overall user population (either "Computer Users" 510, "Mobile Web Users" 512, or "Mobile Non-web Users" 508).

The aforementioned three populations are likely to overlap: an individual may simultaneously be a computer user, a mobile device web user, and a mobile device app user. However, different census data providers will usually have different reach amongst each of these three sub-populations.

In order for the census data 211 to provide credible data for use in calibration, census data vendors are preferentially selected such that simultaneously the reach among each of these three populations is maximized (preferably approaching 100%), and the likelihood that a particular user is double-counted across the census data vendors is minimized (preferably approaching 0%).

In practice, one way to credibly approach 100% reach across all three measured sub-populations is to combine multiple census data sources. However, because it is necessary to minimize the likelihood that a particular unique user has been double-counted, audience overlap between these census data sources must be minimized a priori. It is recommended that one implementing the system of the present invention carefully selects census data vendors so as to accurately determine their reach and overlap in and across each sub-population measured.

The census data is preferably processed and compared on a timely basis (e.g. monthly) against other sources of data, for calibration purposes, and to adjust the correction calculus so that the published estimations e.g. about the number of devices in use, or new devices activated, are as close to the true numbers as possible.

The census data may be sourced in a raw level format, including for example a table disclosing, for each field communicating about the type of the user or device, the nominal or relative number of unique users seen during a certain time period, and/or the nominal or relative number of actions observed during a certain time period e.g. for a certain country.

In some embodiments, the system may be configured to utilize raw level strings in the provided raw level information to identify the user type, device type, and used app, automatically or semi-automatically (e.g. with human curation). The raw level strings may include, for instance, alphanumeric pieces of data serving as identifiers. Similarly, based on e.g. any device related IDs, such as serial numbers, temporal or permanent, unique number of devices may be counted for any device and/or app-specific part of the census data.

In some embodiments of this invention, the panels 216, 218 may be recruited without technical means of controlling behavioral bias in their respective sample stratifications.

While the structural study 208 provides for some measure of demographic control and calibration, its declarative basis renders its behavioral value somewhat meaningless for calibration of the panels' 216, 218 behavioral representativeness.

In some cases, the census data may contain particular data points reflecting the behavior of an entire defined sub-population of users, devices, or services. Such census data may be used so as to calibrate any inadvertent behavioral bias resulting from the aforesaid inability to incorporate behavioral characteristics into the respective panels' 216, 218 sample stratification. One example of census data which can provide census-level behavioral data for use in calibration is census-level information about applications available in mobile application stores (app stores), which is represented as app store data 212.

Switching over to FIG. 6, the app store data or similar data can be cleverly collected by robot(s)/crawler(s) programmed to scan publicly available or proprietary interfaces e.g. periodically, the embodiment of which is illustrated in the figure at 600.

E.g. on a daily basis (once every 24 hours), the system of the present invention may be configured to connect to the monitored app stores or other more or less corresponding content delivery/distribution platforms, optionally via suitable API(s), and iterate through each application listed in the app store. Regarding each application, it may be configured to record e.g. one or more data points such as the app store in question, a timestamp, the name of the application in question, etc.

Regarding each application, it may be configured to record e.g. one or more of the following data items:

App Store. A unique identifier that indicates the app store from which data was collected.

Timestamp. A UTC timestamp indicative of when the data was collected from the app store.

Application Identity. The ID code or name (or other unique identifier) of the application in question.

Information about the position of the app in the ranking list(s).

App Category. Data describing how the application is categorized.

The app store crawler may have a master server unit 608 that is able to store data into a raw database 612, and access metadata storage 610, which contains information about already scanned and categorized apps, and e.g. the status of the app store crawler.

Then, the app store crawler may be configured to utilize several different user accounts and/or other emulator-oriented features to "pretend" to be or emulate a particular wireless device or particular user, for example, and/or by using either proxies/VPN tunnels 606, or by directly accessing app store APIs (sometimes public, sometimes private), request information either in patches or one by one, from the different app store instances 602, 604 e.g. in different countries, and thereby fetch the relevant data to the platform. The system may be thus designed to use emulator-oriented features and/or other technologies, like selected tunneling and dynamic IP address schemes, to effectively crawl app store APIs of different vendors, countries, and localizations.

Because none, or at least not all, of the available app stores typically publish (publicly) the factual number of downloads for each application, the number of downloads may be estimated based on a variety of data points collected for each application, such as but not limited to country-specific application rankings, user ratings scores, etc.

FIG. 7 depicts, at 700, different aspects of an embodiment regarding a novel estimation technique of download statistics, e.g. number of downloads, based on available information in the form of e.g. rankings and/or ratings (concerning the target entities of the estimation). By this solution, it is, among other uses, possible to produce estimates for a comprehensive set of apps.

Many app stores, such as iTunes™ and Google Play™, do publish some sort of top lists and e.g. ratings for smartphone applications, but they do not publish, at least comprehensively, the actual download numbers of different apps. The download information, however, would be of great interest to many players in the mobile app market, from app developers to market researchers. Preferably, there is still ranking information publicly available about apps in a number of sources such as the aforementioned app stores. To estimate the number of e.g. daily downloads for apps listed in an app store using publicly-available information about each app, and relying on, among other factors, the ranking position published for each app by the app store(s) in question, a number of approaches are next described hereinbelow.

Prior to proceeding with the further details, it is first of all assumed that a well-defined mathematical relationship between rank position in a given app store and the number of (daily) downloads actually experienced by a given app indeed exists, and that rank position data is available. Yet, a set of ground truth data is required in determining a number of model parameters.

Use of a mathematical model to estimate downloads per desired time reference, such as the aforementioned daily downloads taken herein as an example, is thus enabled by the (daily) rank position data obtained e.g. from app store(s) for a given set of apps and a number of properly determined model parameters derived e.g. from an independent source of ground truth data.

Regarding the model itself, a simplistic power law model has been previously suggested, but there are a number of other options providing varying degrees of accuracy when benchmarked against ground truth data. In particular, the following models are set forth:

Exponential:

$$d(r)=a*\exp(b*r)$$

Log-normal:

$$d(r)=a/r^{b}*\exp(c*\log^2(r))$$

Power law with exponential cut-off:

$$d(r)=a/r^{b}*\exp(c*r)$$

Lomax:

$$d(r)=a(1+b*r)^c$$

wherein d(r) refers to (daily) downloads and r to the rank. While the proposed exponential model has only two parameters, the remaining models have three parameters which allow for the modeling of more complex relationships. For example, the log-normal model includes the following parameters: scale parameter a, and shape parameters b and c which determine the steepness and the curvature of the model.

The method proposed involves the following steps:

1. Assume a model 702. In the first step of the method proposed, assume the mathematical model that should apply. E.g. the aforementioned exponential, log-normal, power law with exponential cut-off, and lomax models may be (and preferably are) considered.

2. Fit the parameters 704. Given the model assumed, use external data 712, 714 such as known rank position and download data to fit the parameters to the model in order to obtain restated model 706. This process may be facilitated by converting the models into their logarithmic versions:
Power law:

$$\log(d(r))=\log(a)+b*\log(r)$$

Exponential:

$$\log(d(r))=\log(a)+b*r$$

Log-normal:

$$\log(d(r))=\log(a)-b*\log(r)+c*\log^2(r)$$

Power law with exponential cut-off:

$$\log(d(r))=\log(a)-b*\log(r)+c*r$$

Lomax:

$$\log(d(r))=\log(a)+c*\log(1+b*r)$$

3. For each target app, construct the downloads estimate 710 utilizing 708 the restated model. Having fitted the parameters to the model, apply e.g. one of the two algorithms described below to estimate the number of downloads for a particular app, depending on the external data 716 available.

Algorithm 1 refers to situations wherein current (daily) data is available. When the external (ground truth) data is daily in nature and currently available for a sample of apps, it is possible to estimate the number of downloads for an app outside of this sample with a given rank r using any one of the parameterized/fitted models described above. The process for implementing this algorithm may take the following steps:

1. For the model selected, estimate the value of all parameters other than r by assuming values for r as taken from the external (ground truth) data and using the logarithmic version of the applicable model to estimate the remaining parameters.
2. Restate the original model selected, applying the estimated parameter values from (1) in place of the parameters indicated in the model.
3. Given an app with rank r in a given day, the number of downloads of that app in that given day can then be estimated by calculating the formula determined in (2).

Algorithm 2 refers to scenarios in which there is a discontinuous availability of external (ground truth) data, such that initially there is daily data available and subsequently there is only monthly data available. Then it is still possible to estimate the number of downloads for an app with a given rank r using any one of the parameterized/fitted models described above.

The procedure for implementing algorithm 2 includes:
1. Estimate shape parameters as applicable by calculating the average of the appropriate parameters over a daily model prepared based on the daily data for the time period when that daily data was available.
2. Estimate the scale parameter a by:
(a) Taking the highest values of downloads as seen in the external data for the previous two months, and;
(b) Dividing each value from (a) by 30 to determine a linear estimate of the number of daily downloads for each day of the previous two months, and;
(c) Using the values from (b), linearly extrapolate the number of downloads d for the current date (or the date in question). Based on d and if needed shape parameters from (1), estimate parameter a.

3. Restate the original model formula selected, applying the parameter values from (1) and (2) in place of the parameters in the model.
4. Given an app with rank r in a given day, the number of downloads of that app in that given day can then be estimated by calculating the formula determined in (3).

With reference to FIG. 8 and scenario depicted at 800, the research meter application logic 217 running at user devices is configured to provide a passive way of observing/recording panelist usage of digital devices. It is specifically meant to passively observe, record, and upload 814 a log 812 of panelist activity to the server(s) of the system for storage and analysis 816, 818.

The metering logic 217 resides in the metered device's memory. When a particular event 808 on the device occurs, the meter 217 is triggered 804 and information about the event logged 806, 810.

Log file management and transfer may adhere to one or more of the following rules and procedures:
- Each log file is fingerprinted to a particular panelist and specific metered device,
- Log files are stored locally on the metered device,
- Log files will be compressed locally on the metered device using a relevant compression algorithm,
- Log files are transferred asynchronously to a 'waiting' (802) remote server based upon the availability of an internet connection,
- To minimize impact on device performance, log transfer will initiate only when an internet connection is available, and/or
- In the event that no internet connection is available for an extended period of time, up to predetermined amount, e.g. about 10 MB, of log files will be stored locally on the metered device.

The data collected by the metering software 217 may be divided into multiple, e.g. three, conceptual categories:
- Event Metadata: This is information that describes the context for the event and is preferably identical across every type of event registered by the research meter;
- Event data: This is information specific to the logged event, and its contents may vary depending on the type of event that has been logged; and/or
- Heartbeat data: This is information which informs the system that the panelist/device remains "active" and connected to the Internet.

Event data logged by the meter 217 will be preferably centrally processed by the server(s) of the system in order to
a) clean the data,
b) connect event metadata, where necessary, to underlying events,
c) map identifiers to the relevant entities, and/or
d) calculate metrics from the logged data.

Every event that is logged by the research meter 217 will preferably log at least some of the following meta-data, for example:
- Panelist/Device ID. This is a unique identifier which identifies a particular panelist and a specific metered device (panelist/device fingerprint).
- Timestamp. This is a UTC timestamp that indicates when the event occurred.
- Geolocation. This is technical information about the Client User's geographic location when the event occurred. If this can be captured at the level of geographic coordinates (through either onboard GPS or wireless location software), that would be ideal. This data point may accept a value of "Unknown".

The meter 217 may be configured to utilize an external server to collect a number of selected data points, preferably still always related to the on-device meter running in the device itself. An exemplary setup of such an implementation will be a VPN or proxy server, through which all or some HTTP data could be directed and separately logged.

The on-device meter 217 may initiate this type of a profile setup through which the external server can be used for such data logging purposes, and the on-device meter 217 will actively complete at least one of the following two items:
1. Authenticate and identify the user, by using a customized profile setup or fingerprints hidden in the traffic, to facilitate the identification of the panelist, or device, and making it comparable/relational to the data that the on-device meter itself is collecting directly.
2. Matching time-stamps, by using some syncing or hidden traces, or proactive HTTP packet transfer, to generate a process through which the timestamps of on-device metering data and data collected at an external server, can be matched perfectly (this involves the creation of so-called offset values between the on-device and external server logging).

One additional feature of the meter 217 is a so-called context data handler, which is configured to add contextual information to any logging activity, regardless of the logging activity taking place in the research meter itself or at a separate server. This context handler may be configured to add location information, device performance information, and/or screen status information to any measurement. One practical purpose of this feature is to add information about the user activity and screen status, to data collected from external (more dummy) servers, like VPN or proxy servers. Thereby, active use traffic can be separated from background traffic activities in any device—active use meaning that the screen is on and the user is doing something active with the device.

The amount of information logged for different events depends on the nature of the event being logged. The events collected can be related to application usage, Internet page requests, placed voice calls etc.

In its raw form, data collected by the meter 217 will be extremely granular and may encompass many thousands of web sites, mobile applications, operating systems, user-agents, and mobile devices. The granularity of this data creates two separate problems in the data production and data delivery process:
  Alignment of data granularities. Data that is essential to the data production process (i.e. structural study data, app store data, HTTP data) is not collected at the same level of granularity as data collected by the meter 217. In order to calculate and apply scale/proportion factors derived from these components, the highly-granular data must be categorized so as to align with less granular data sources.
  Customer experience. In order for customer deliverable to be navigable and readable, it is important that the customers are provided with the ability to browse and search for the specific entities (i.e. web sites, mobile applications, operating systems, user-agents, mobile devices) that interest them. While a search experience can support highly granular data, a browsing experience of deliverables etc. via the system UI cannot: it would be impossible to find specific entities amongst the tens of thousands of entities contained at a granular level.

One feasible way to effectively address both of these issues is to develop a system for managing metadata 214.

The metadata that will reside within the metadata management system will be used during the data production process and will be essential to producing the final set of deliverable data.

The aforementioned metadata 214 is used to categorize/organize the entities that are observable e.g. within the research meter log files, the app store data 212, the census data 211 in general, and/or the structural study data 208. Because the framework described herein encompasses a variety of conceptual entities, it shall simultaneously support a variety of ontological schemas. In general, these schemas can be divided into two disparate categories:
  Univalent Schema. Entities included under a univalent schema have one canonical categorization method. Their hierarchy is canonically defined by e.g. the system staff managing and updating the system and related logic(s).
  Multivalent Schema. Entities assigned to a multivalent schema will have multiple canonical organization methods. Clients in different audiences will likely have different approaches to entity categorization depending upon their particular business needs. Each multivalent schema shall be its own organization method and shall be deemed canonical according to the editing rules defined by staff members.

Because many of the entities measured by the framework described herein are multivalent in nature, this means that there will be several different canonical schemas according to which the system described in this invention publishes its data.

With reference to FIG. 9, each of these schemas may be derived from one or more sources as implied in the figure. Taxonomy editors 902 may include e.g. the entity implementing the overall methodology. One or more schemas developed and maintained by the system staff using e.g. a custom-built meta-data management system could be assumed as the "default" canonical schema. Yet, e.g. app stores 914 and technology vendors 920 may provide categorization schemas considering e.g. the fact that applications available in app stores have been typically categorized by their developers/the app store itself. System taxonomy 906 may be established. Still, end-users of the provided reporting tools, for instance, may define their own taxonomies and categories 912, through the application of which data is then presented to them.

Generally, in the context of the present invention, provision of reliable, objective deliverables on the desired topics further requires both validating the panel data and calibrating it utilizing the available means.

Therefore, preferably automatically upon receipt of panel data, the system is configured to pre-process the data. In particular, the following steps may be taken:
  Validation of panelists: panelists are validated using the validation rules applicable to the concerned panel 216, 218. Following validation, those (i.e. data from) panelists that have been marked as valid can be subjected to further pre-processing steps.
  Calculation of metrics and/or data reorganization. In order to accelerate calculation of deliverables, raw logs from validated panelists are processed in order to determine predetermined metrics and/or to organize the data into a structure conducive for further analysis.
  Associate Metadata. In parallel to the calculation of necessary metrics/reorganization of raw data, records are associated with corresponding metadata entries.

Following the pre-processing of panel data, calibration actions may be executed using data such as census-level data 211 and/or sample-derived stratification data, optionally structural study 208.

The calibration process may be and typically is a semi-manual or semi-automated process, potentially requiring e.g. an analyst to compute various values, input them into analytical systems, run computational processes, analyze the results, and repeat the process as necessary.

Conceptually, the calibration process may include phases of data reviewing, control value calculation, and application of one or more processing algorithms such as a raking algorithm to determine proper calibration weights for the user-level data based on the established control values.

FIG. 10 illustrates, by way of a general example only, one embodiment of a sample review procedure for calibration variable and category selection to enable control value determination. It shall be understood by a person skilled in the art that he/she may adapt e.g. the illustrated procedure, or utilize an alternative one, to better meet the design objectives set by each real-life use scenario of the present invention.

Indeed, available sample data 1002 may be analyzed and e.g. the following indication determined:

Category frequencies 1004, the frequency of individual categories among validated panelists (e.g. Gender: Male as a percentage of the total unweighted sample) for the calibration variables.

Nominal totals/Means 1006, the total value of nominal calibration variables (i.e. total mobile application downloads) and the mean value of nominal calibration variables.

Category case counts 1008, the unweighted count of cases in each category among validated panelists (e.g. the number of cases with Gender: Male) for all calibration variables.

Based on the above calculations, selected categories may be collapsed (frequency/count below a predetermined threshold) to enhance calibration stability, for instance. An optimized set of calibration variables and categories is to be formed 1010.

Finally, the system is configured to calculate control values 1012 based on these calibration variables and categories by utilizing the available census-level data 211 and e.g. data provided by the structural study 208.

Following calibration, the deliverables may be further subjected to a series of selected quality control checks. This quality control process may be carefully conducted e.g. on a monthly basis, following the updating of structural study calibration data. During quality control procedures, both data stability and accuracy could be examined using any suitable methods as appreciated by a skilled person.

Ultimately, the deliverable(s) may be stored in at least one data repository such as a database on the system back-end, and the customers may be granted access to specific data items via the system UI.

In particular, data may be delivered to subscribing clients via a web-based interface. This web-based interface may conform to one or more of the following features:

Compatible with major browsers (i.e. MSIE, Firefox, Chrome, Safari).

Delivery over SSL.

Similar functionality/look-and-feel across all clients (i.e. data available/content may differ across client groups, but the tool remains the same).

In the above, various embodiments of the present invention were discussed in detail. These embodiments were generally related to both mobile and Internet devices and other similar devices connected to wireless or wired communications networks, and showed how commonly available mobile and Internet devices can be harnessed to automatically and passively collect data on the context of the terminal, such as network or device parameters or performance, or on the behavior of a user relative to the usage of that particular device or other surrounding devices or networks, and ultimately how all of this data can be funneled into a system that creates either cached or real-time analytics and different types of derivative information based on the collected data, and may combine that data with data from other devices or data related to other people, and finally present the cultivated data through various applications back to the user or other recipients.

However, a skilled person will appreciate the fact the scope is not limited to the explicitly disclosed embodiments but covers also other realizations falling under the claim wordings.

What is claimed:

1. A system for obtaining and analyzing data on online user behavior and other activity having regard to Internet connectable user devices, optionally mobile devices, the system comprising:

one or more processors configured to:

for each respective user of a plurality of users:

collect, from a plurality of user devices of the respective user, individual user-level data by passive metering, wherein a subset of the plurality of user devices is comprised of one or more master devices that (1) acquire user usage activity via application programming interfaces of other user devices with the respective user that are not configured to directly communicate the user usage activity of the respective user with the one or more processors, and (2) incorporate the acquired user usage activity and additional user usage activity at the one or more master devices into the user-level data; and collect census-level data acquired from network-centric and user-independent data sources, indicating behavior and demographic characteristics across an entire, greater population of users incorporating the plurality of users as a research sample, active devices, or measured services, wherein the census-level data further comprises ranking positions of applications posted on at least one content distribution platform, the one or more processors further configured to convert, for each respective application that is present in the user-level data, a respective ranking position into a number of downloads of the respective application, wherein the user-level data and the census-level data is acquired separately, said user-level data being collected using at least one user research panel of controlled constitution, from multiple user devices of each participant in the user panel, said collected data being indicative of one or more of Internet, content, media, application, and device usage;

organize the obtained user-level data and census-level data into a multivalent categorized data set utilizing an ontological metadata schema; and determine an electronic report or other deliverable based on an integration of the user-level data and the census-level data, the census-level data being utilized to calibrate the sample of user-level data acquired from the user devices of the plurality of users, the calibration including weighting the user-level data in relation to categories of the census-level data to adjust a related bias to enhance a representativeness of the sample in relation to the greater population of users, services, or devices, the deliverable having a dynamically customer-selectable scope in terms of a number of interest factors regarding used devices or online behaviors, including, for the applications, one or more of: application usage, application distribution, content usage, content distribution, application monetization, user demographics, device distribution, device characteristics, device usage, and time factors.

2. The system of claim 1, wherein the collected data further includes sample-derived statistical stratification data that estimates the distribution of demographic characteristics across the user population, the one or more processors being configured to organize the stratification data into said data set and utilize the data set in the determination of the deliverable, including the calibration of the user-level data.

3. The system of claim 1, wherein the ontological metadata schema incorporates a unified metadata database, which describes interrelationships and provides for matching concepts and subjects, even though measured and reflected differently in different platforms and data sources providing the collected data, but reflecting same topics.

4. The system of claim 1, wherein the metadata schema incorporates a plurality of canonical schemas to categorize and organize data, optionally including a plurality of univalent and multivalent schemas, further optionally including one or more of the canonical schemas for producing a deliverable being selected dynamically by a deliverable recipient.

5. The system of claim 1, wherein the metadata schema incorporates a plurality of canonical schemas to categorize and organize data, optionally including a plurality of univalent and multivalent schemas, further optionally including one or more of the canonical schemas for producing a deliverable being selected dynamically by a deliverable recipient, said one or more processors being configured to utilize the metadata schema to align more granular user-level data with less granular census-level data through data categorization.

6. The system of claim 1, wherein the one or more processors are configured to collect user-level data utilizing measurement and logging application by passive metering installed at the user devices, optionally wireless terminal devices.

7. The system of claim 1, wherein the one or more processors are configured to collect user-level data utilizing measurement and logging logic by passive metering integrated with software intended for another use, said logic being bundled with the software.

8. The system of claim 1, wherein the one or more processors are configured to collect user-level data indicative of behavioral or contextual events external to a user device obtained via a sensor, optionally a camera or a microphone, of the device.

9. The system of claim 1, wherein measurement and logging logic at a user device for enabling user-level data collection comprises at least one feature selected from a group consisting of: a heartbeat data collector indicative of device or user activity periods and/or connectivity periods relative to the Internet, user identity logging, event data logging, event metadata or context data logging, timestamp logging, geolocation logging, WiFi status logging, online status logging, carrier logging, roaming status logging, orientation mode logging, download data logging, upload data logging, matching and logging of on-device data and external device provided data.

10. The system of claim 1, wherein a master device of the one or more master devices is configured to execute at least one action selected from a group consisting of: track and log data traffic, signals, or other events that take place between the other user devices and the master device, poll passively or actively the application programming interfaces (API) of the other user devices functionally attached to the master device in order to collect the user usage activity comprising measurement data, store collected measurement data temporarily or for a pre-determined duration of time, and send the measurement data to one or more network based data collection servers for analysis.

11. The system of claim 1, wherein the one or more processors are configured to obtain census level-data from or via a number of Internet network-centric data sources comprising at least one element selected from a group consisting of: a network carrier, an ad network, an ad exchange, a site or app analytics platform, a network gateway, a network proxy, a content management platform, an application (APP) store, and another content delivery or distribution platform.

12. The system of claim 1, wherein the one or more processors are configured to obtain census-level data indicating one or more of the distribution and scale of subject characteristics from an Internet network-centric data source.

13. The system of claim 1, wherein the one or more processors are configured to obtain census-level data indicating one or more of the distribution and scale of subject characteristics from an Internet network-centric data source, wherein said census-level data includes data points indicative of the behavior of one or more defined populations of users, devices, applications, services, or web sites per pre-determined time period, optionally on a daily basis.

14. The system of claim 1, wherein the one or more processors are to obtain census-level data regarding a number of applications from at least one content distribution platform optionally including an application store or digital market place.

15. The system of claim 1, wherein the one or more processors are configured to obtain census-level data regarding applications from at least one content distribution platform optionally including an application store or digital market place, and the one or more processors are further configured to connect to at least one app store or other remote content distribution platform utilizing a crawler or robot logic entity configured, in order to obtain said census-level data, to execute at least one action selected from a group consisting of: emulate a user or user device associated with the platform, apply platform related API (application programming interface), connect to a proxy between the system and the platform, and apply a VPN tunneling technique.

16. The system of claim 1, wherein the one or more processors are configured to obtain census-level data regarding applications from at least one content distribution platform optionally including an application store or digital market place, and the one or more processors are further configured to estimate the number of downloads of an application based on the ranking position thereof and a model applying the ranking position to provide the estimate, wherein the system is configured to utilize at least one model selected from a group consisting of: exponential model, log-normal model, power law based model with exponential cut-off, and Lomax model.

17. The system of claim 1, wherein the one or more processors are configured to obtain census-level data regarding applications from at least one content distribution platform optionally including an application store or digital market place, the one or more processors are further configured to estimate the number of downloads of an application based on the ranking position thereof and a model applying the ranking position to provide the estimate, and wherein a daily number of downloads is estimated based on preferably daily ranking position information.

18. The system of claim 1, wherein the one or more processors are configured to obtain census-level data regarding applications from at least one content distribution platform optionally including an application store or digital market place, and the one or more processors are further configured to utilize said census-level data obtained from said at least one content distribution platform for quality control of behavioral estimates derived based on user-level data and/or to calibrate the user-level data.

19. The system of claim 1, wherein the one or more processors are configured to determine a plurality of demographic and behavioral calibration factors based on the census-level data for the user-level data for the calibration.

20. The system of claim 1, further comprising a plurality of functionally-connected servers.

21. The system of claim 1, further comprising
a plurality of functionally-connected servers; and
a plurality of user devices and optionally a number of census-level data providing network-centric providing data sources.

22. The system of claim 1, wherein the one or more processors are configured to estimate the user base of user devices and optionally change rate thereof based on the census data preferably including Internet network-centric data.

23. The system of claim 1, wherein the system is configured to distinguish, in the determining the electronic report or other deliverable, between user-level data originating from different user devices of the plurality of user devices of the user based on device identifiers associated with the user-level data acquired from the user devices.

24. A method for obtaining and analyzing data on online user behavior and other activity having regard to Internet connectable user devices, the method comprising:
for each respective user of a plurality of users:
collecting, via one or more processors from a plurality of user devices of the respective user, individual user-level data by passive metering, wherein a subset of the plurality of user devices is comprised of one or more master devices that (1) acquire user usage activity via application programming interfaces of other user devices with the respective user that are not configured to directly communicate the user usage activity of the respective user with the one or more processors, and (2) incorporate the acquired user usage activity and additional user usage activity at the one or more master devices into the user-level data; and
collecting census-level data acquired from network-centric and user-independent data sources, indicating behavioral and demographic characteristics across an entire, greater population of users incorporating the plurality of users as a research sample, active devices, or measured services,
wherein the census-level data further comprises ranking positions of applications posted on at least one content distribution platform, the one or more processors further configured to convert, for each respective application that is present in the user-level data, a respective ranking position into a number of downloads of the respective application,
wherein the user-level data and the census-level data is acquired separately, said user-level data being collected using at least one user panel of controlled constitution, from multiple user devices of each participant in the user panel, said collected data being indicative of one or more of Internet, content, media, application, and device usage;
organizing the obtained user-level data, census-level data, and optionally sample-derived stratification data into a multivalent categorized data set utilizing an ontological metadata schema; and
determining an electronic report or other deliverable based on an integration of the user-level data, the census-level data, and optionally the sample-derived stratification data, the census-level data and optionally the sample-derived stratification data being utilized to calibrate the sample of user-level data acquired from the user devices of the plurality of users, the calibration including weighting the user-level data in relation to categories of the census-level data to adjust a related bias to enhance a representativeness of the sample in relation to a greater population of users, services, or devices, the deliverable having a dynamically customer-selectable scope in terms of a number of interest factors regarding used devices or online behaviors, including, for the applications, one or more of application usage, application distribution, content usage, content distribution, application monetization, user demographics, device distribution, device characteristics, device usage, and time factors.

25. A computer program product embodied on a non-transitory computer readable medium, comprising code for obtaining and analyzing data on online user behavior and other activity having regard to Internet connectable user devices, the code causing one or more processors to execute a method comprising:
for each respective user of a plurality of users:
collecting, from a plurality of user devices of the respective user, individual user-level data by passive metering, wherein a subset of the plurality of user devices is comprised of one or more master devices that (1) acquire user usage activity via application programming interfaces of other user devices with the respective user that are not configured to directly communicate the user usage activity of the respective user with the one or more processors, and (2) incorporate the acquired user usage activity and additional user usage activity at the one or more master devices into the user-level data; and
collecting census-level data acquired from network-centric and user-independent data sources, indicating behavioral and demographic characteristics across an entire, greater population of users incorporating the plurality of users as a research sample, active devices, or measured services, and optionally also sample-derived statistical stratification data that estimates a distribution of demographic characteristics across the user population,
wherein the census-level data further comprises ranking positions of applications posted on at least one content distribution platform, the one or more processors further configured to convert, for each respective application that is present in the user-level data, a respective ranking position into a number of downloads of the respective application, wherein the user-level data and the census-level data is acquired separately, said user-level data being collected using at least one user panel of controlled constitution, from multiple user devices of each participant in the user panel, said collected data being indicative of one or more of Internet, content, media, application, and device usage;

organizing the obtained user-level data, census-level data, and optionally sample-derived stratification data into a multivalent categorized data set utilizing an ontological metadata schema; and determining an electronic report or other deliverable based on an integration of the user-level data, the census-level data, and the optionally sample-derived stratification data, the census-level data and optionally the sample-derived stratification data being utilized to calibrate the sample of user-level data acquired from the user devices of the plurality of users, the calibration including weighting the user-level data in relation to categories of the census-level data to adjust a related bias to enhance a representativeness of the sample in relation to the greater population of users, services, or devices, the deliverable having a dynamically customer-selectable scope in terms of a number of interest factors regarding used devices or online behaviors, including, for the applications, one or more of: application usage, application distribution, content usage, content distribution, application monetization, user demographics, device distribution, device characteristics, device usage, and time factors.

* * * * *